United States Patent
McElmurry et al.

(10) Patent No.: US 10,080,110 B1
(45) Date of Patent: Sep. 18, 2018

(54) BRACKET FOR MOUNTING A PUSH-TO-TALK BUTTON OFF A CONTROL COLUMN OF AN AIRPLANE STEERING YOKE

(71) Applicants: Mike McElmurry, Alton, MO (US); Josh Roberts, Alton, MO (US)

(72) Inventors: Mike McElmurry, Alton, MO (US); Josh Roberts, Alton, MO (US)

( * ) Notice: Subject to any disclaimer, the term of this patent is extended or adjusted under 35 U.S.C. 154(b) by 18 days.

(21) Appl. No.: 15/210,152

(22) Filed: Jul. 14, 2016

Related U.S. Application Data

(60) Provisional application No. 62/192,254, filed on Jul. 14, 2015.

(51) Int. Cl.
| | |
|---|---|
| *F16M 13/00* | (2006.01) |
| *H04W 4/10* | (2009.01) |
| *F16M 13/02* | (2006.01) |
| *B64C 13/24* | (2006.01) |
| *B64D 47/00* | (2006.01) |

(52) U.S. Cl.
CPC .............. *H04W 4/10* (2013.01); *B64C 13/24* (2013.01); *B64D 47/00* (2013.01); *F16M 13/022* (2013.01)

(58) Field of Classification Search
CPC .................................. F16B 2/10; F16M 13/00
USPC ................ 248/230.4, 231.51, 228.4, 229.23; 74/512, 560
See application file for complete search history.

(56) References Cited

U.S. PATENT DOCUMENTS

| | | | |
|---|---|---|---|
| 4,200,837 A | 4/1980 | Larsen et al. | H04B 1/38 |
| D363,936 S | 11/1995 | Nysether et al. | D14/238 |
| 5,626,320 A | 5/1997 | Burrell et al. | B64D 43/00 |
| 5,845,885 A | 12/1998 | Carnevali | F16M 11/14 |
| 5,903,227 A | 5/1999 | Scheuer | H04B 1/38 |
| 6,160,496 A | 12/2000 | Scheuer | H04B 1/38 |
| D464,250 S | 10/2002 | Warner et al. | D8/355 |
| 6,472,622 B1 | 10/2002 | Besier | B60Q 1/1461 |
| 6,935,883 B2 | 8/2005 | Oddsen, Jr. | H01R 13/625 |
| 7,090,181 B2 | 8/2006 | Bibi et al. | F16C 11/106 |
| RE42,060 E | 1/2011 | Carnevali | F16M 11/14 |
| RE42,581 E | 8/2011 | Carnevali | F16M 11/14 |
| 8,179,672 B2 | 5/2012 | Carnevali | G06F 1/16 |
| 8,215,583 B2 | 7/2012 | Groomes et al. | B64C 13/04 |
| RE43,806 E | 11/2012 | Carnevali | F16M 11/14 |
| 8,550,412 B2 | 10/2013 | Slade et al. | G05G 1/44 |
| 8,701,912 B2 | 4/2014 | Carnevali et al. | B63B 49/00 |
| 8,740,665 B1 | 6/2014 | Bowers | A63H 30/04 |

(Continued)

*Primary Examiner* — Steven M Marsh
(74) *Attorney, Agent, or Firm* — Jonathan A. Bay

(57) ABSTRACT

A bracket (20) for mounting a touch-to-talk actuator (38) off of a control column (24) of an airplane steering yoke (26) has a split collar (22) for clamping onto the control column (24) and an elongated support rod (32) cantilevered from the split collar (22), providing a distal mounting end (36) for the touch-to-talk actuator (38). Wires (44) link the touch-to-talk actuator (38) with controls in the airplane cockpit for intercom, radio, phone or other voice-communication path between the pilot and others, whether on the ground or elsewhere. The support rod (32) is elongated, configured and cantilevered from the split collar (22) such that the touch-to-talk actuator (38) is proximal one of the handles or hand grip portions of the steering yoke (26) so that the pilot can actuate it with a single digit, like his or her thumb, without otherwise letting go of the steering.

21 Claims, 7 Drawing Sheets

(56) References Cited

U.S. PATENT DOCUMENTS

| | | | | |
|---|---|---|---|---|
| 8,961,340 B2* | 2/2015 | Boatwright | ........ | A63B 59/0044 |
| | | | | 248/316.5 |
| 2001/0030269 A1* | 10/2001 | Evans | .................... | F16M 13/02 |
| | | | | 248/214 |
| 2012/0261520 A1 | 10/2012 | Groomes et al. | ....... | B64C 13/04 |
| 2012/0312552 A1* | 12/2012 | Rayssiguier | .......... | E21B 17/023 |
| | | | | 166/380 |
| 2015/0108306 A1* | 4/2015 | Chuang | .................. | F16M 11/14 |
| | | | | 248/231.51 |

* cited by examiner

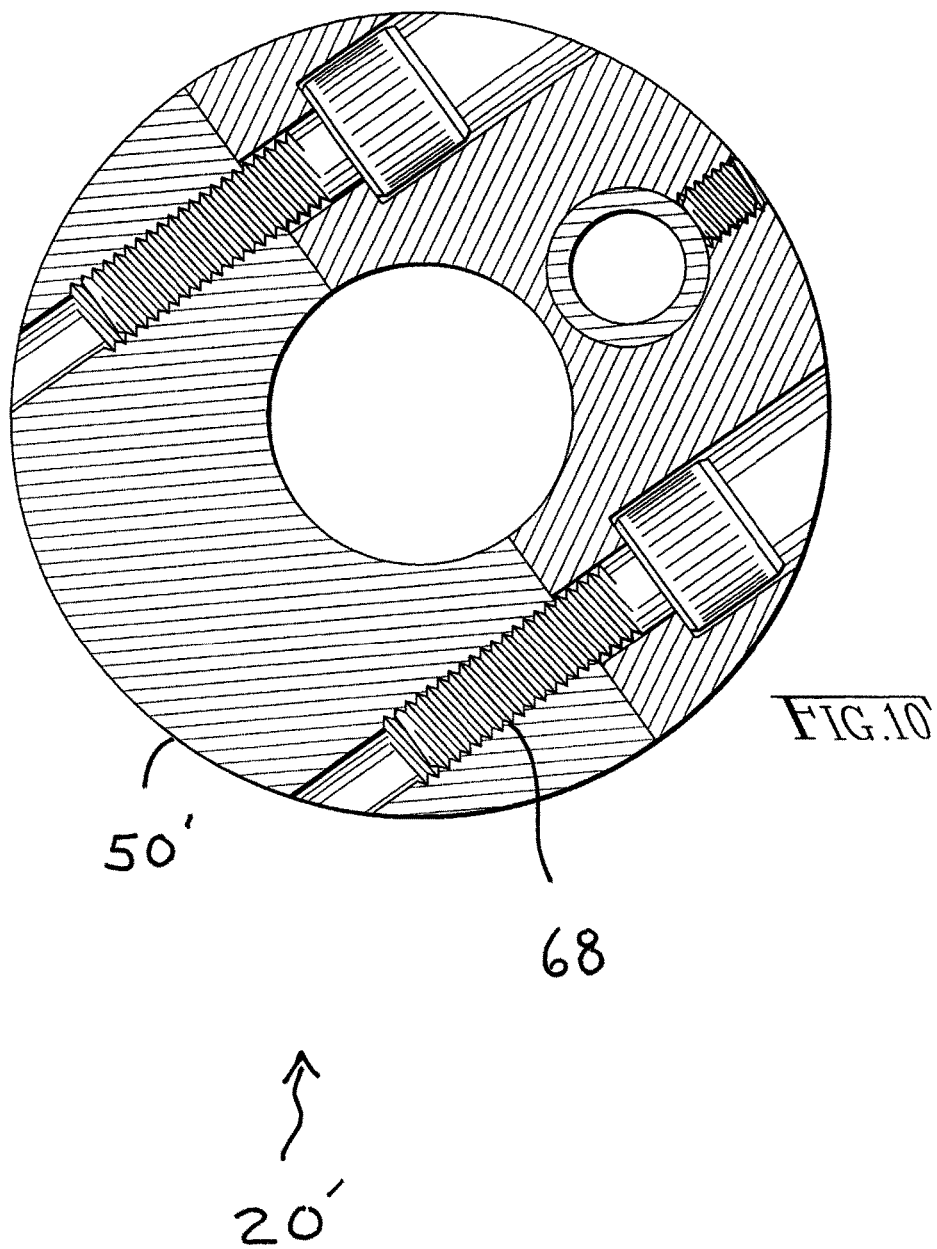

US 10,080,110 B1

BRACKET FOR MOUNTING A PUSH-TO-TALK BUTTON OFF A CONTROL COLUMN OF AN AIRPLANE STEERING YOKE

CROSS-REFERENCE TO PROVISIONAL APPLICATION(S)

This application claims the benefit of U.S. Provisional Application No. 62/192,254, filed Jul. 14, 2015, the disclosure of which is incorporated herein by this reference thereto.

BACKGROUND AND SUMMARY OF THE INVENTION

The invention relates to brackets and, more particularly, to a bracket for mounting to an elongate column and cantilevering an elongate rod.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 10 is a sectional view taken along lines X-X in FIG. 9.

DETAILED DESCRIPTION OF THE PREFERRED EMBODIMENTS

Figure 1:
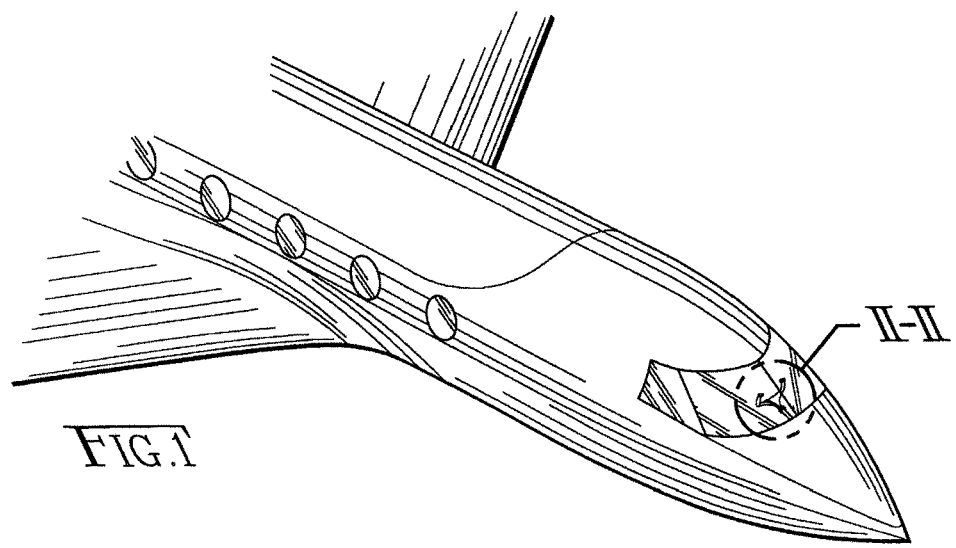
FIG. 1 is a perspective view of the nose of an airplane showing a steering yoke at the end of a control column inside the cockpit as seen through the windshield and illustrating an example use environment for brackets in accordance with the invention.

FIG. 1 is a perspective view of the nose of an airplane, and shows a steering yoke at the end of a control column inside the cockpit as seen through the windshield, whereby FIG. 1 illustrates an example use environment for brackets in accordance with the invention.

Figure 2:
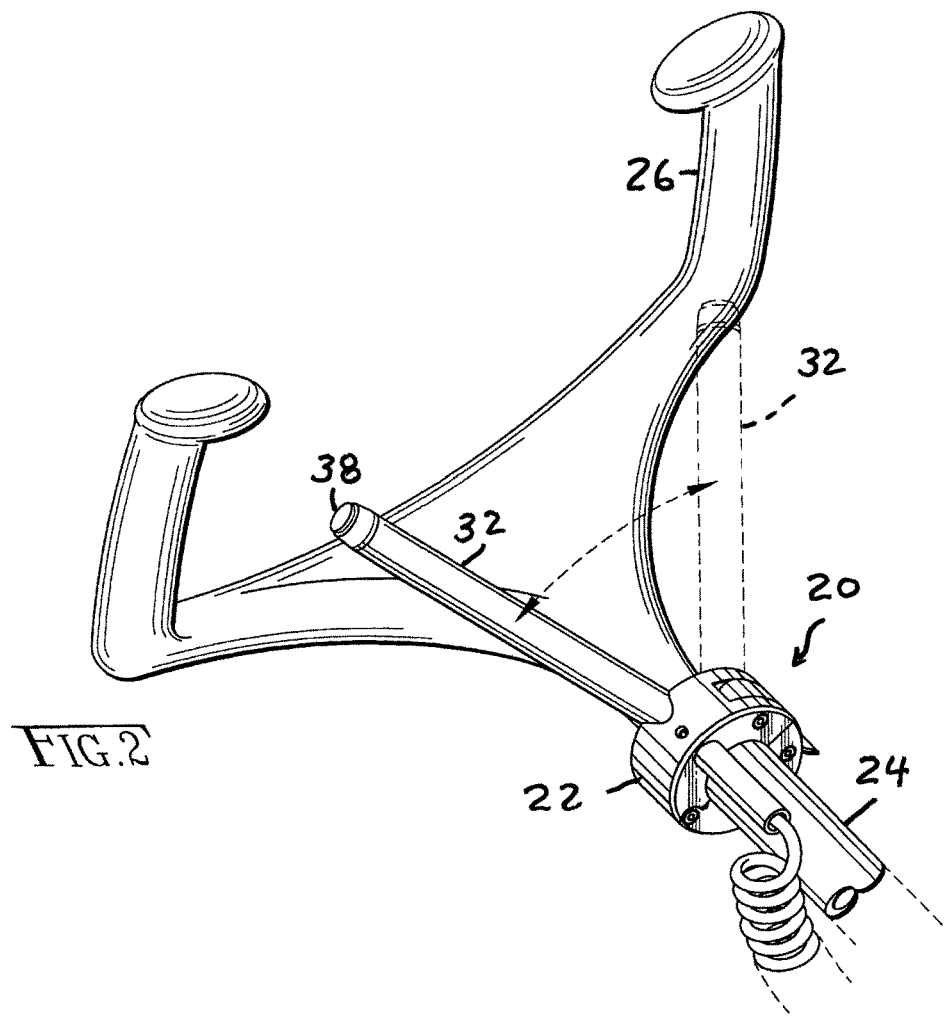
FIG. 2 is an enlarged scale perspective view of detail II-II in FIG. 1 showing a bracket in accordance with the invention for mounting a push-to-talk button off of the control column of an airplane steering yoke.

FIG. 2 is an enlarged scale perspective view of detail II-II in FIG. 1 showing a first embodiment of a bracket 20 in accordance with the invention for mounting a push-to-talk button 38 off of the control column 22 of an airplane steering yoke. The steering yoke 26 is configured in a U-shape, with the two upright arms serving as handles or hand grips, and spaced apart by a lower web.

Figure 3:
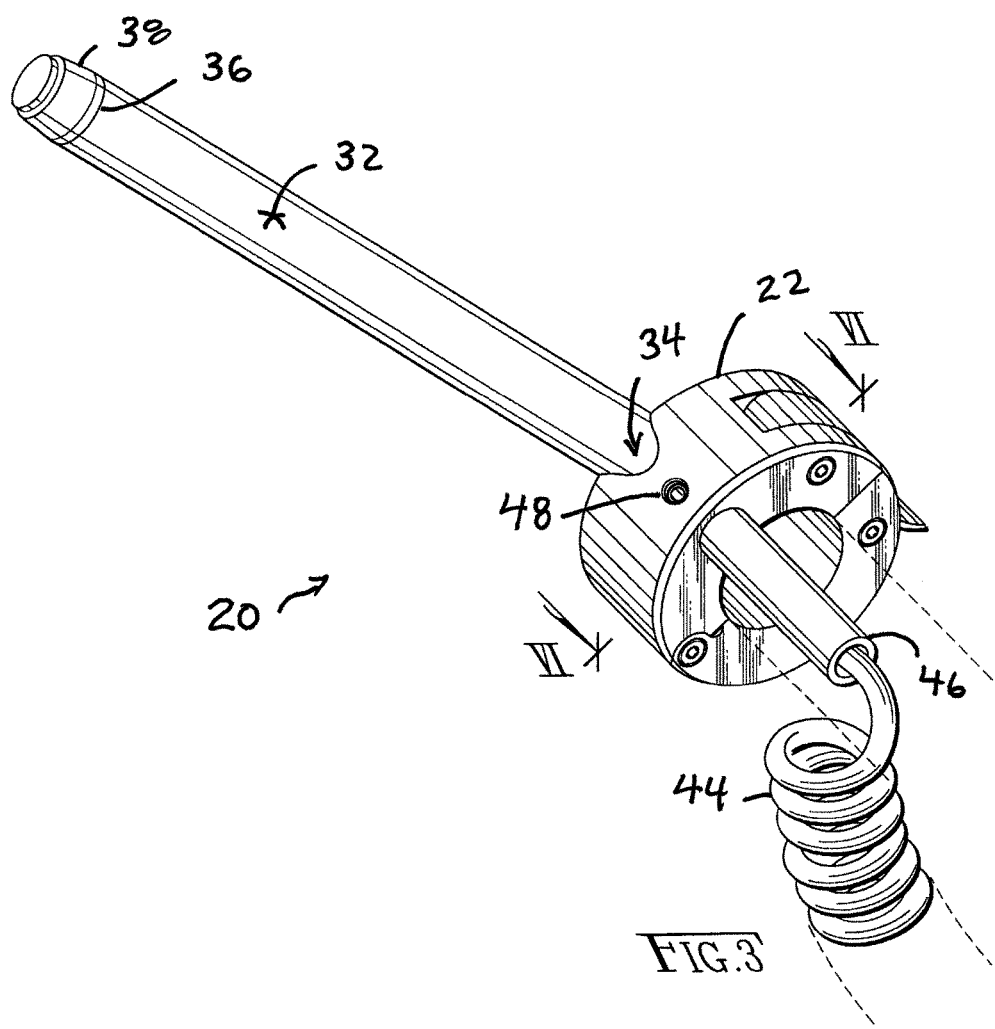
FIG. 3 is another perspective view of the bracket in FIG. 2 except on an enlarged scale and with the steering column and control yoke removed from view.

FIG. 3 is another perspective view of the bracket 20 in FIG. 2 except on an enlarged scale and with the steering yoke 26 and control column 24 removed from view.

Figure 4:
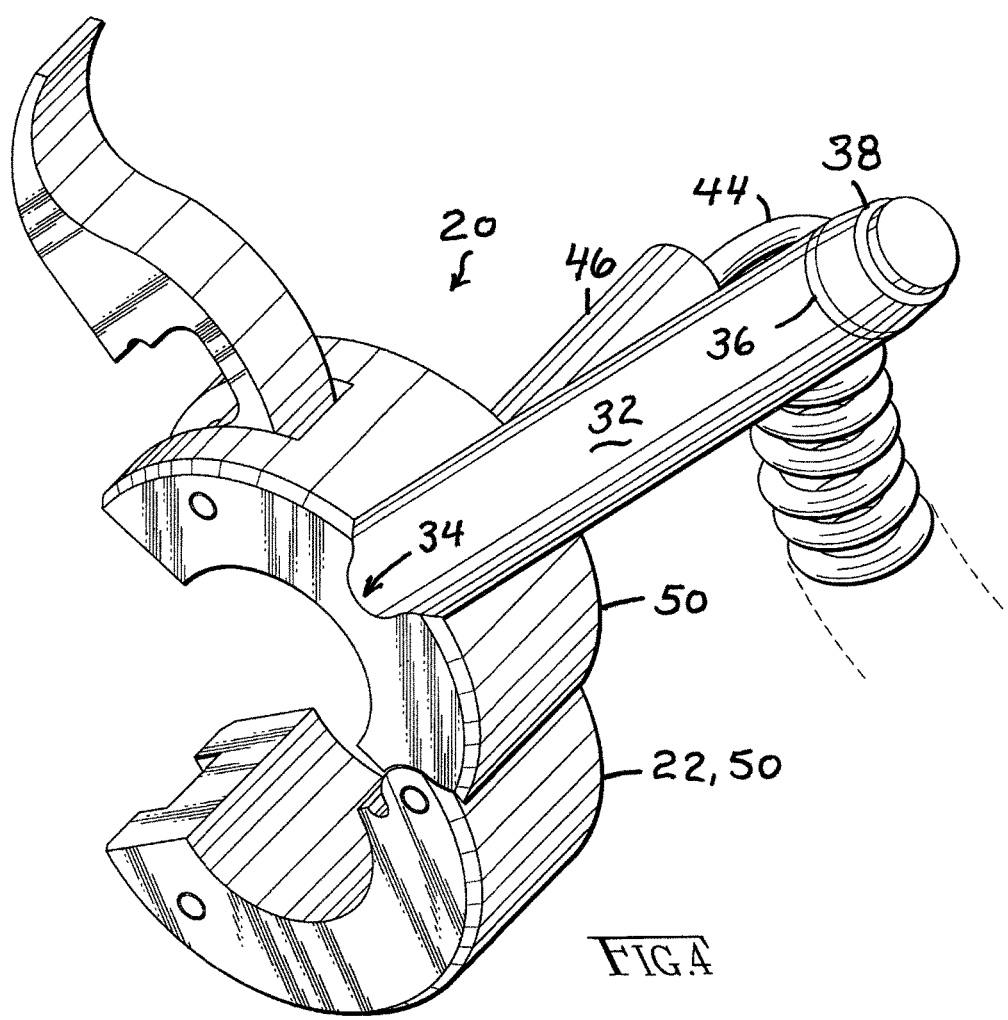
FIG. 4 is an enlarged scale perspective view of the mounting bracket shown in FIG. 3 except taken from an upper-rearward-outboard perspective thereof, and showing the split collar opened apart about a pivot pin.
Figure 5:
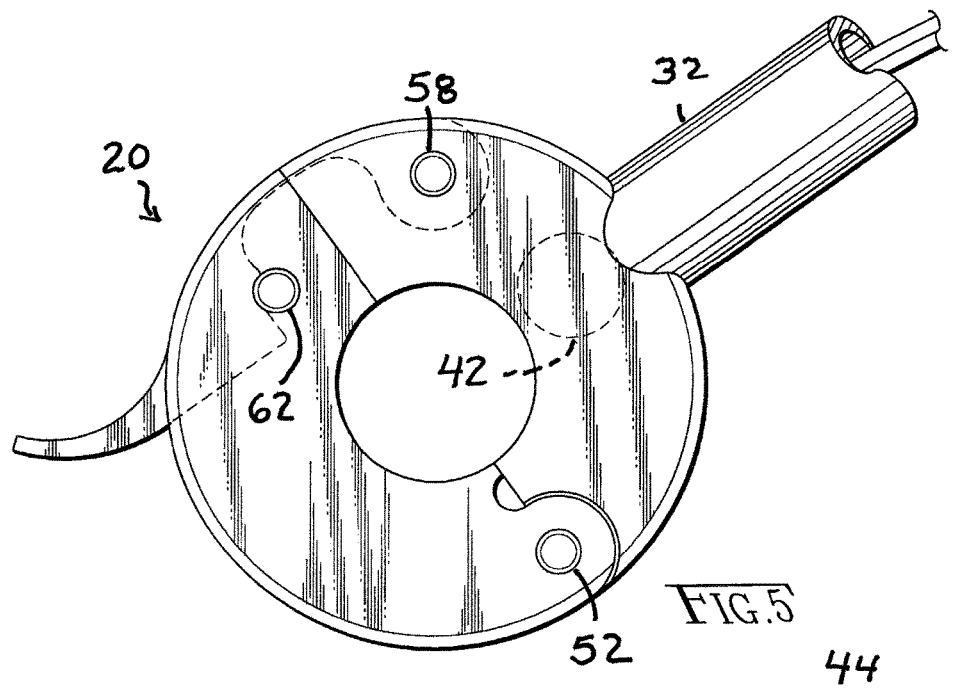
FIG. 5 is an enlarged-scale rear elevational view of the split collar, with portions of the cantilevered rod broken away.
Figure 6:
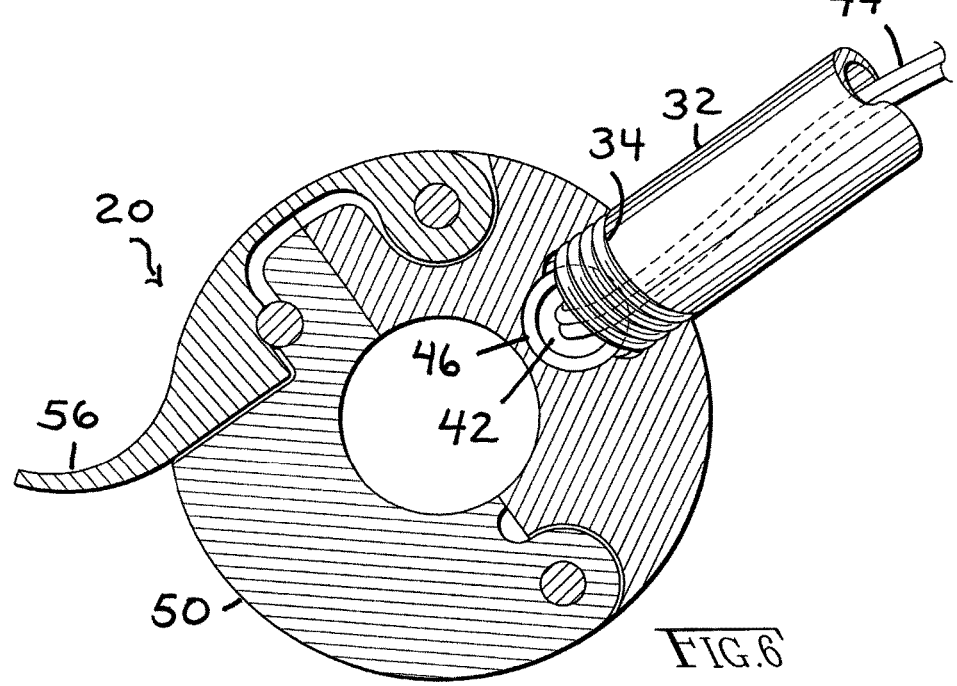
FIG. 6 is a partial sectional view taken along line VI-VI in FIG. 3.
Figure 7:
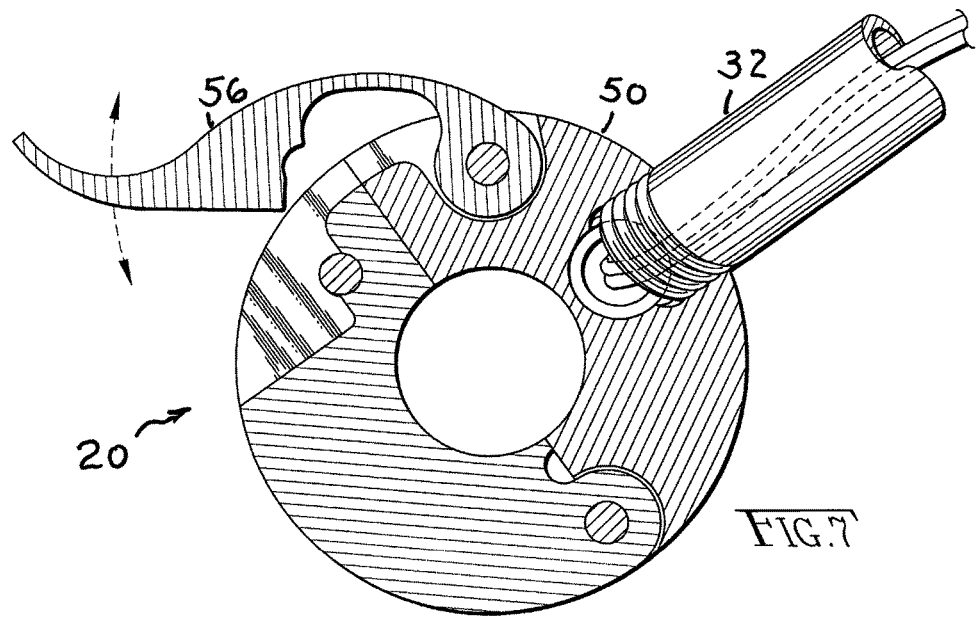
FIG. 7 is a partial sectional view comparable to FIG. 6 except showing the camming latch opened to an unlocked position.
Figure 8:
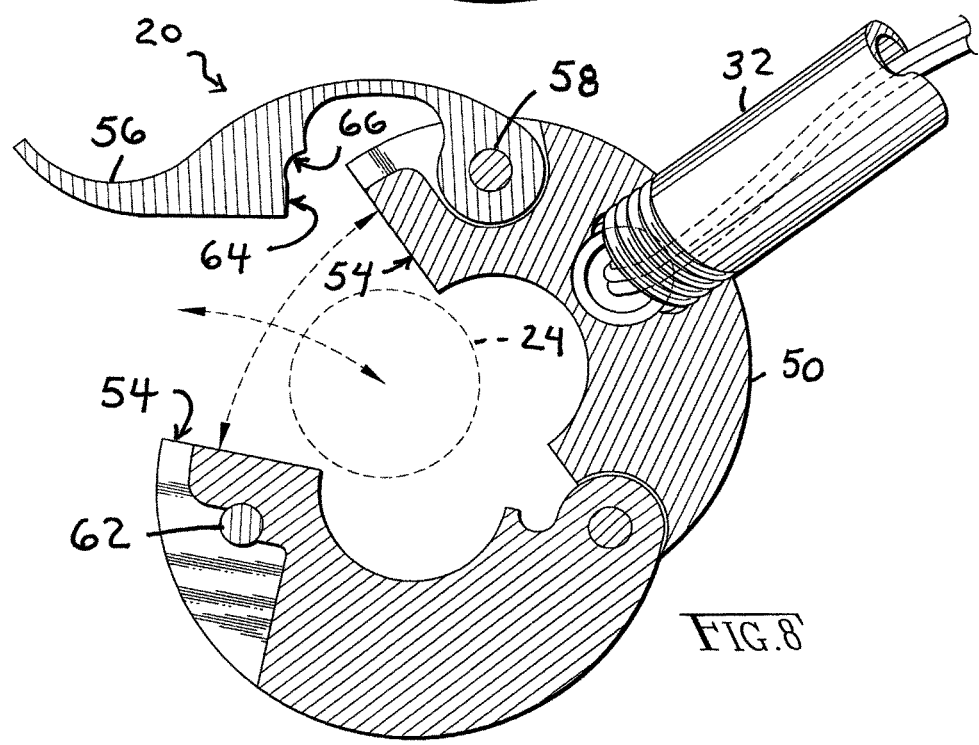
FIG. 8 is a partial sectional view comparable to FIGS. 6 and 7 except showing the split collar pivoted to a wide open position to allow withdrawal of the split collar off of and away from the control column (shown in dashed lines)

FIG. 4 is an enlarged scale perspective view of the mounting bracket 20 shown in FIG. 3 except taken from an upper-rearward-outboard perspective thereof, and showing the split collar 22 opened apart about a pivot pin 58. FIG. 5 is an enlarged scale rear elevational view of the split collar 22, with portions of the cantilevered rod 32 broken away. FIG. 6 is a sectional view taken along line VI-VI in FIG. 3. FIG. 7 is a section view comparable to FIG. 6 except showing the caroming latch 56 opened to an unlocked position. FIG. 8 shows the split collar 22 pivoted to a wide open position to allow withdrawal of the split collar 22 off of and away from the control column 24 (shown in dashed lines).

The bracket 20 comprises a split collar 22 for clamping onto the control column 24 of a steering yoke 26. The bracket 20 carries a support rod 32. The support rod 32 is cantilevered out of the collar 22 by a threaded connection into the collar 22. The support rod 32 is hollow and extends between an open threaded end 34 and an open mounting end 36. The open mounting end 36 is bored through a little ways with an oversize bore to leave behind a small shoulder. A push button 38 or other kind of switch or actuator is pushed down in the oversize bore portion of the open mounting end 36 of the rod 32 until the base end of the push button 38 seats on the shoulder.

The collar 22 has an access bore 42 intersecting the open threaded end 34 of the rod 32 for the passing of electric wires 44 to the push button 38. The wires 44 are run through a plastic sleeve 46 where the wires 44 are run into the collar 22. The collar 22 accommodates a set screw 48 for retention of the plastic sleeve 46. Ultimately, the wires 44 are connected to form a communication path between the push button 38 and some controls in the cockpit of the plane. Presumably this would be an intercom, radio, phone or other voice-communication path between the pilot and others, whether on the ground or elsewhere.

The collar 22 is split into a pair of opposing jaws 50. In FIGS. 2-8, the jaws 50 are pivoted together about a pivot pin 52. Hence the jaws 50 can be opened to pass over or be withdrawn away from the control column 24. The jaws 50 meet when closed at meeting edges 54, and are thus disposed in a clamping disposition on the control column 24. A latch 56 pivoted from another pivot pin 58 to lock the jaws 50 shut. The opposite jaw has a set pin 62 comparable to the pivot pins 52 or 58 but from which nothing is pivoted. The latch 56 has a cam surface 64 which is forced over the set pin 62. The latch has a recess 66 past the cam surface 64 which comes to rest partly surrounding the set pin 62. This way, the latch 56 remains locked because a significant applied force is required to move the cam surface 64 across and past the set pin 62 to thereby open the latch 56 (and thus allow the opening of the jaws 50 of the split collar 22).

Figure 9:
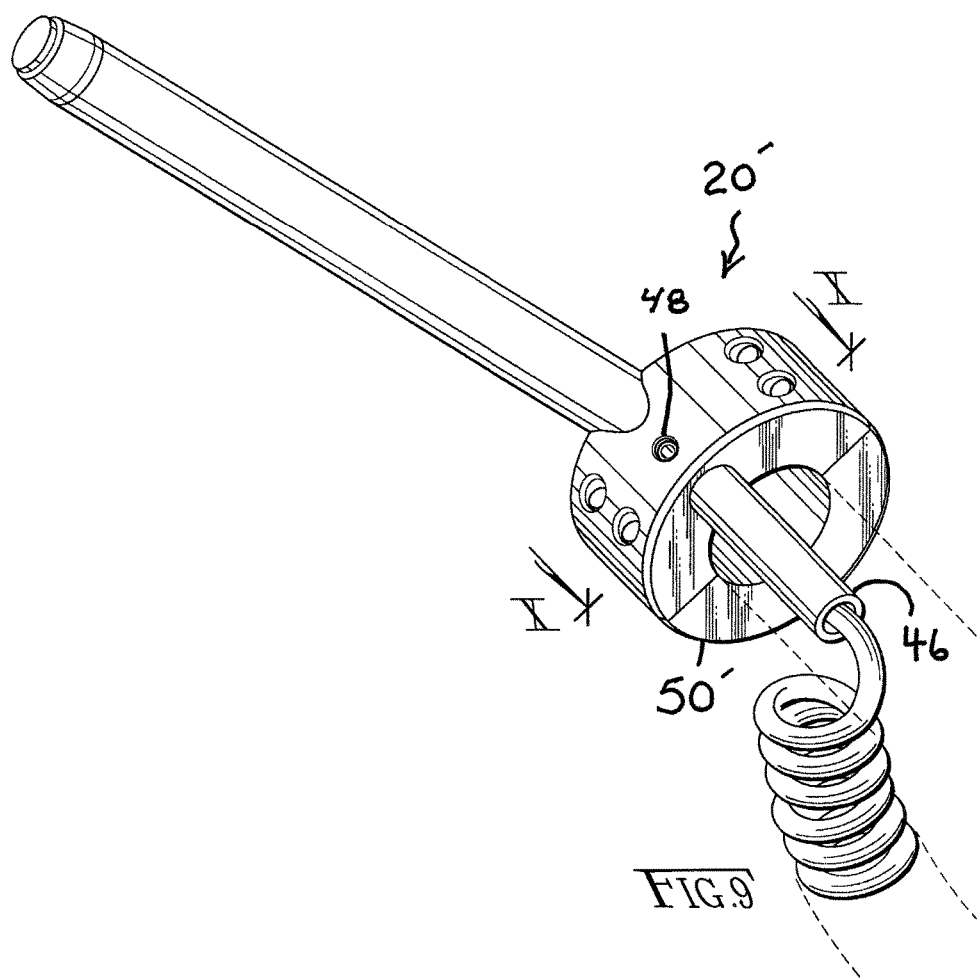
FIG. 9 is a perspective view comparable to FIG. 3 except of an alternate embodiment of a bracket in accordance with the invention for mounting a push-to-talk button off of the control column of an airplane steering yoke.

FIG. 9 is a perspective view comparable to FIG. 3 except showing an alternate embodiment of a bracket 20' in accordance with the invention for mounting a push-to-talk button off of the control column of an airplane steering yoke. FIG. 10 is a sectional view taken along lines X-X in FIG. 9.

Here, the jaws 50' are not hinged but instead driven together in a clamping disposition on the control column 24 by two pair of cap screws 68.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A bracket (20) for mounting a touch-to-talk actuator (38) off of a control column (24) of an airplane steering yoke (26), said steering yoke (26) having spaced handles or hand grip portions for a pilot to grasp with each hand; said bracket (20) comprising:
   a split collar (22) for clamping onto the control column (24) of the steering yoke (26);
   said split collar (22) having opposed body halves (50) which cooperatively together in a SHUT position are cooperatively formed with and define a major axial through-bore sized for encircling the control column (22) snugly;
   said split collar (22) being formed with a passage (42 in part) having at least an inlet opening;
   an elongated support rod (32) extending between a base end (34) cantilevered from the inlet opening of the passage (42 in part) of the split collar (22), and, a distal mounting end (36);
   said inlet opening the passage (42 in part) formed in the split collar (22) being provided with first provisions, and, said base end (34) of the elongated support rod (32) being provided with reciprocal provisions (34) whereby said support rod (32) is cantilevered from the inlet opening of the through passage (42 in part) of the split collar (22) by the respective interconnection of said first provisions and said reciprocal provisions (34);
   a touch-to-talk actuator (38), and, a communication path (44) between the touch-to-talk actuator (38) and the airplane cockpit;
   said distal mounting end (36) of the support rod (32) being formed with further provisions for the mounting thereto of the touch-to-talk actuator (38);
   said support rod (32) being elongated, configured and cantilevered from the split collar (22) such that the touch-to-talk actuator (38) is proximal one of the handles or hand grip portions of the steering yoke (26).

2. The bracket (20) of claim 1, wherein:
at least one of the body halves (50) of the split collar (22) is produced from a monolithic piece of material.

3. The bracket (20) of claim 2, wherein:
both body halves (50) of the split collar (22) are produced from a monolithic piece of material respectively.

4. The bracket (20) of claim 3, wherein:
reversible fasteners (68) for fastening both body halves (50) into a clamped SHUT position on the control column (24);
whereby the fasteners (68) are reversible to slacken the body halves (50) either for removal of the bracket (20) and/or adjustment of the proximal relationship between the touch-to-talk actuator (38) and one of the handles or hand grip portions of the steering yoke (26).

5. The bracket (20) of claim 4, wherein:
said support rod (32) being furthermore elongated, configured and cantilevered from the split collar (22), and split collar (22) being adjustable on the control column (24), such that the touch-to-talk actuator (38) is close enough to one of the handles or hand grip portions of the steering yoke (26) that the pilot can actuate the touch-to-talk actuator (38) with a single digit of his or her hand grasping the respective handle or hand grip portion, without otherwise letting go his or her grasp on that respective handle or hand grip portion.

6. The bracket (20) of claim 4, wherein:
said support rod (32) being furthermore elongated, configured and cantilevered from the split collar (22), and split collar (22) being adjustable on the control column (24), such that the touch-to-talk actuator (38) is close enough to one of the handles or hand grip portions of the steering yoke (26) that the pilot can actuate the touch-to-talk actuator (38) with the thumb of his or her hand grasping the respective handle or hand grip portion, without otherwise letting go his or her grasp on that respective handle or hand grip portion.

7. The bracket (20) of claim 2, wherein:
both the at least one and also the other of the body halves (50) of the split collar (22) are produced out of metallic materials.

8. The bracket (20) of claim 1, wherein:
the support rod (32) comprises a hollow rod (32);
the communication path (44) comprises electric wires (44); and
the split collar (22) is formed with a through passage (42 in part) having not only an inlet opening but also an outlet opening (42 in part);
whereby the wires (44) from the touch-to-talk actuator (38) are extended through the hollow support rod (32), and the through passage (42 in part) in the split collar (22), and onwards from there to controls in the cockpit of the plane.

9. The bracket (20) of claim 8, wherein:
the mounting end (36) of the support rod (32) comprising an opening to the core of the hollow support rod (32);
the open mounting end (36) is bored through a little ways with an oversize enlargement to leave behind a small shoulder; and
the touch-to-talk actuator (38) comprises a cylindrical body that has a base end, and is pressed into the oversize enlargement of the open mounting end (36) of the rod (32) until the base end of the touch-to-talk actuator (38) seats on the shoulder.

10. The bracket (20) of claim 8, wherein:
the collar (22) is formed with an access bore (42) intersecting the open threaded end (34) of the rod (32) for the passing of electric wires (44) from the touch-to-talk actuator (38) to the controls of the cockpit; and
said bracket (20) further comprising a resilient sleeve (46) where the wires (44) run out of the access bore of the collar (22) whereby providing strain relief and/or abrasion/cut protection for the electric wires (44).

11. The bracket (20) of claim 10, further comprising:
a removable retention provision (48) for retention of the resilient sleeve (46).

12. The bracket (20) of claim 1, further comprising:
a pivot pin (52);
wherein the opposed body halves (50) comprise a pair of opposing jaws (50 pivoted together about pivot pin (52);
whereby the jaws (50) can be opened to be adjusted along, rotated around, or be withdrawn away from the control column (24).

13. The bracket (20) of claim 1, further comprising:
a releasable latch (56) for latching the jaws (50) shut in the SHUT position;
whereby the latch (56) can be released so that the jaws (50) can be opened relative to the SHUT position and thus thereafter be adjusted along, rotated around, or be withdrawn away from the control column (24).

14. The bracket (20) of claim 13, further comprising:
a latch pivot pin (58) associated with one of the jaws (50) for pivoting the latch (56) relative said one jaw (50).

15. The bracket (20) of claim 14, further comprising:
a retention provision (62) associated with the other of the jaws (50) for releasably retaining the latch (56) to releasably retain the jaws (50) in the SHUT position.

16. The bracket (20) of claim 15, wherein:
said retention provision (62) comprises a set pin (62) set on a axis parallel with the latch pivot pin (58);
said other jaw (50) being formed with axial lumen for retaining the set pin (62) such that the axial lumen has an angularly open gap of less that one-hundred eighty angular arc degrees (180° arc) apart such that the set pin (62) cannot be radially dislocated from the axial lumen therefor;
whereby the set pin (62) has a cylindrical sidewall, portions of which are exposed, by the angularly open gap of less that one-hundred eighty angular arc degrees (180° arc) apart in the axial lumen therefor in said other jaw.

17. The bracket (20) of claim 16, wherein:
said latch (56) is formed with a cam surface (64) for reversibly riding over the exposed portions of the set pin (62) reversibly between the SHUT and open positions therefor'
said latch (56) being further formed with a recess (66) angularly inside of the cam surface (64) relative the rotational direction of the pivoting of the latch (56) to the SHUT position;
whereby said set pin (62) nests inside said recess (66) to retain the latch (56) in the SHUT position.

18. The bracket (20) of claim 17, wherein:
the jaws (50), the latch 56, and the pins (52, 58 and 62) are produced out of metallic materials.

19. The bracket (20) of claim 18, wherein:
the pins (52, 58 and 62) are produced out of steel.

20. The bracket (20) of claim 17, wherein:
the set pin (62) is produced out of a relatively hard material; and
the latch (56)'s cam surface 64 is produced out a relatively softer material.

21. The bracket (20) of claim 12, wherein:
each jaw (50) extends from pivot end where the jaws (50) are pivoted about the pivot pin (52), and, a circumferentially spaced away terminal edge (54);
whereby when the jaws (50) are cooperatively pivoted together in a SHUT position, said the major axial through-bore has been closed to a size for encircling the control column (22) snugly.

* * * * *